United States Patent
Dinica et al.

(10) Patent No.: US 11,520,063 B2
(45) Date of Patent: Dec. 6, 2022

(54) SHOCK RESISTANT DOWNHOLE GAMMA RAY DETECTOR ASSEMBLY

(71) Applicant: QCD Technology, Inc., Calgary (CA)

(72) Inventors: Cornel Dinica, Calgary (CA); Richard Johnson, Calgary (CA); Anthony Desmond Russell, Okotoks (CA)

(73) Assignee: QCD Technology, Inc.

( * ) Notice: Subject to any disclaimer, the term of this patent is extended or adjusted under 35 U.S.C. 154(b) by 0 days.

(21) Appl. No.: 16/138,079

(22) Filed: Sep. 21, 2018

(65) Prior Publication Data

US 2019/0094392 A1 Mar. 28, 2019

(30) Foreign Application Priority Data

Sep. 25, 2017 (CA) .................................... 2980336

(51) Int. Cl.
| | | |
|---|---|---|
| G01T 1/202 | (2006.01) |
| G01T 1/20 | (2006.01) |
| E21B 47/017 | (2012.01) |
| G01T 1/208 | (2006.01) |
| G01T 1/28 | (2006.01) |
| G01V 5/06 | (2006.01) |
| E21C 39/00 | (2006.01) |

(52) U.S. Cl.
CPC .......... *G01T 1/2026* (2013.01); *E21B 47/017* (2020.05); *G01T 1/2002* (2013.01); *G01T 1/2018* (2013.01); *E21C 39/00* (2013.01); *G01T 1/208* (2013.01); *G01T 1/28* (2013.01); *G01V 5/06* (2013.01)

(58) Field of Classification Search
CPC ... E21B 47/011; G01T 1/2002; G01T 1/2026; G01T 1/208; G01T 1/2018; G01T 1/28; G01V 5/06
See application file for complete search history.

(56) References Cited

U.S. PATENT DOCUMENTS

| | | | |
|---|---|---|---|
| 2,949,534 A * | 8/1960 | Youmans ................. | G01V 5/04 250/261 |
| 5,038,042 A * | 8/1991 | Hansen ................... | G01T 1/202 250/368 |
| 5,047,635 A * | 9/1991 | Leaney ................. | E21B 47/011 250/256 |
| 6,222,192 B1 * | 4/2001 | Sekela ..................... | G01V 5/04 250/361 R |
| 6,452,163 B1 | 9/2002 | Frederick et al. | |
| 6,781,130 B2 | 8/2004 | Frederick et al. | |
| 7,115,873 B2 | 10/2006 | Medley et al. | |

(Continued)

FOREIGN PATENT DOCUMENTS

WO 2008150836 A1 12/2008

*Primary Examiner* — Chih-Cheng Kao
(74) *Attorney, Agent, or Firm* — St. Onge Steward Johnston & Reens LLC (57) ABSTRACT

A downhole gamma ray detector having improved resistance to shocks and vibrations encountered during use of modern drilling techniques. The detector includes a scintillator with a window for emitting photons upon receipt of gamma rays. The window faces a photon-receiving end of a photomultiplier tube. The scintillator and the photomultiplier tube are held in a fixed arrangement with respect to each other to provide an empty gap between the window and the photon-receiving end of the photomultiplier tube.

5 Claims, 7 Drawing Sheets

(56) References Cited

U.S. PATENT DOCUMENTS

| | | | |
|---|---|---|---|
| 7,381,957 B2 | 6/2008 | Medley et al. | |
| 7,485,865 B2 | 2/2009 | Medley et al. | |
| 2003/0122082 A1 | 7/2003 | Frederick et al. | |
| 2003/0168602 A1* | 9/2003 | Testardi | A61N 5/1048 250/363.01 |
| 2004/0251416 A1* | 12/2004 | Baldwin | G01F 23/288 250/361 R |
| 2009/0283691 A1* | 11/2009 | Stoller | G01V 5/10 250/390.1 |
| 2017/0184731 A1* | 6/2017 | Deere | E21B 49/00 |
| 2017/0335674 A1* | 11/2017 | Laban | E21B 44/005 |

* cited by examiner

SHOCK RESISTANT DOWNHOLE GAMMA RAY DETECTOR ASSEMBLY

CROSS-REFERENCE TO RELATED APPLICATIONS

This application claims priority from Canadian Patent Application No. 2,980,336 filed on Sep. 25, 2017, the entire disclosure of which is incorporated herein by reference.

FIELD OF THE INVENTION

The invention relates to downhole gamma detectors and more specifically to downhole gamma detectors having improved resistance to vibrations and shocks induced by modern drilling techniques.

BACKGROUND

Gamma ray logging is a method of measuring naturally occurring gamma radiation to characterize the rock or sediment in a borehole or drill hole. It is a logging method used in mining, mineral exploration, water-well drilling, for formation evaluation in oil and gas well drilling and for other related purposes. Different types of rock emit different amounts of gamma radiation with different spectra. In particular, shales usually emit more gamma rays than other sedimentary rocks, such as sandstone, gypsum, salt, coal, dolomite, or limestone because radioactive potassium is a common component in their clay content, and because the cation exchange capacity of clay causes them to absorb uranium and thorium. This difference in radioactivity between shales and sandstones/carbonate rocks allows the gamma ray detector to distinguish between shales and non-shales.

The gamma ray log, like other types of well logging, is done by lowering an instrument down the drill hole and recording gamma radiation variation with depth. In the United States, the device most commonly records measurements at ½-foot intervals. Gamma radiation is usually recorded in API units, a measurement originated by the petroleum industry. Gamma logs are attenuated by diameter of the borehole because of the properties of the fluid filling the borehole, but because gamma logs are most often used in a qualitative way, corrections are usually not necessary.

Three elements and their decay chains are responsible for the radiation emitted by rock: potassium, thorium and uranium. Shales often contain potassium as part of their clay content, and tend to absorb uranium and thorium as well. A common gamma-ray log records the total radiation and cannot distinguish between the radioactive elements, while a spectral gamma ray log (see below) can.

An advantage of gamma logging over some other types of well logs is that it works through the steel and cement walls of cased boreholes. Although concrete and steel absorb some of the gamma radiation, enough travels through the steel and cement to allow qualitative determinations.

In gamma logging, gamma rays are detected with a downhole gamma ray detector. Conventional downhole gamma ray detectors include a combination of components including a scintillator to generate photons upon gamma ray impact, a photomultiplier tube which receives photons and converts their energy to signals and an electronics module for sending signals to the surface.

Gamma detectors are sensitive and must be protected from harsh environments to survive and to produce accurate, noise free signals. This protection must include protection from physical shock and stress, including force, vibration, and abrasion, encountered during solid mineral mining and oil drilling operations. However, the closer in proximity the gamma detector is to the mineral being mined or drilled, the greater is the shock, vibration and stress to which the detector is subjected.

The presence of armor, which is required to protect the detector, further limits the available space. An explosion-proof housing takes up even more of the available space, and often results in reducing the diameter of the photomultiplier tube. When light detecting devices of relatively low mass density are used in connection with scintillation elements having a relatively high mass density, a special means of support is needed to reduce rotation moments when under high vibration or high shock. Lower cost for providing protection for the detector is also needed.

Advances have been made in recent years that improve the survivability and performance of gamma detectors that are used in mining, drilling, and other harsh environments. Yet, there remains a need for further improvements. One area of need arises whenever large scintillation crystals are used in a harsh environment such as mining. Long term wear and damage to the support system from continual high shocks can occur due to the larger mass of the scintillation element. Shock isolation must be done with sufficient care to not damage the interface between the crystal and the light collecting element. Another area of need is for a support system that can be designed with less engineering and analytical expertise, so that components can be fabricated with more ease and at a lesser cost.

A support system must be very effective in protecting the detector from the harsh vibrations and shock, but must also do so while consuming a small amount of space. Similarly, in mining operations, the outer portions of the detector and the armor must provide a high level of shielding from unwanted radiation and must protect the detector from impact and abrasion, all with a minimal use of space.

Improvements to downhole gamma ray detectors are disclosed, for example, in U.S. Patent Publication No. 20030122082, and U.S. Pat. Nos. 6,452,163, 6,781,130, 7,115,873, 7,381,957, 7,485,865, and in International Patent Publication No. WO2008150836, each of which is incorporated herein by reference in its entirety.

There continues to be a need for improvements in downhole gamma ray detectors which provide enhanced resistance to shocks and vibrations induced by drilling.

SUMMARY

In accordance with one aspect of the invention, there is provided a downhole gamma ray detector comprising: a scintillator with a window for emitting photons upon receipt of gamma rays, the window facing a photon-receiving end of a photomultiplier tube, wherein the scintillator and the photomultiplier tube are held in a fixed arrangement with respect to each other to provide an empty gap between the window and the photon-receiving end of the photomultiplier tube.

In accordance with another aspect of the invention, there is provided a downhole gamma ray detector comprising: a scintillator with a window for emitting photons upon receipt of gamma rays, the window facing a photon-receiving end of a photomultiplier tube, wherein the scintillator and the photomultiplier tube are held in a fixed arrangement with respect to each other to provide an empty gap between the window and the photon-receiving end of the photomultiplier tube and a sleeve is provided to cover the scintillator and the photomultiplier tube.

In some embodiments, the scintillator and the photomultiplier tube are connected to each other with an adapter to provide the fixed arrangement and the empty gap is within the interior of the adapter.

In some embodiments, the detector further comprises a rigid outer housing for covering the sleeve.

In some embodiments, the sleeve is formed of elastomeric material and includes grooves to improve cushioning of the scintillator, the adapter and the photomultiplier tube from contact with the outer housing's inner sidewall.

In some embodiments, the detector, comprises an electronics module with two opposed panels and a space therebetween, the detector having a wiring harness for transmission of electrical power and signals, the wiring harness running through the space between the two opposed panels.

In some embodiments, the photomultiplier tube and the electronics module are both held within a chassis which connects to the adapter.

In some embodiments, the sleeve covers the chassis, the adapter and the scintillator and a spring is provided between the electronics module and the photomultiplier tube.

In some embodiments, the detector further comprises an end cap fixed to each end of the outer housing.

In some embodiments, the end cap of each end of the outer housing is configured to engage with the outer housing in a collet mechanism.

In some embodiments, the collet mechanism is provided by an inner ring which connects to the end cap with a pair of screws which compress a collet therebetween.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

Rationale

Powerful improvements in drilling techniques in recent years have created new problems for downhole instrumentation. The power and speed of the new drilling mechanisms produce much stronger shocks and vibrations during the drilling process. This tends to damage sensitive downhole measurement equipment on a fairly routine basis. As a result, improvements to a number of different downhole data logging tools are needed. The present inventors have recognized a need for significant improvements to downhole gamma ray detector systems to cope with strong shocks and vibrations.

Figure 1A:
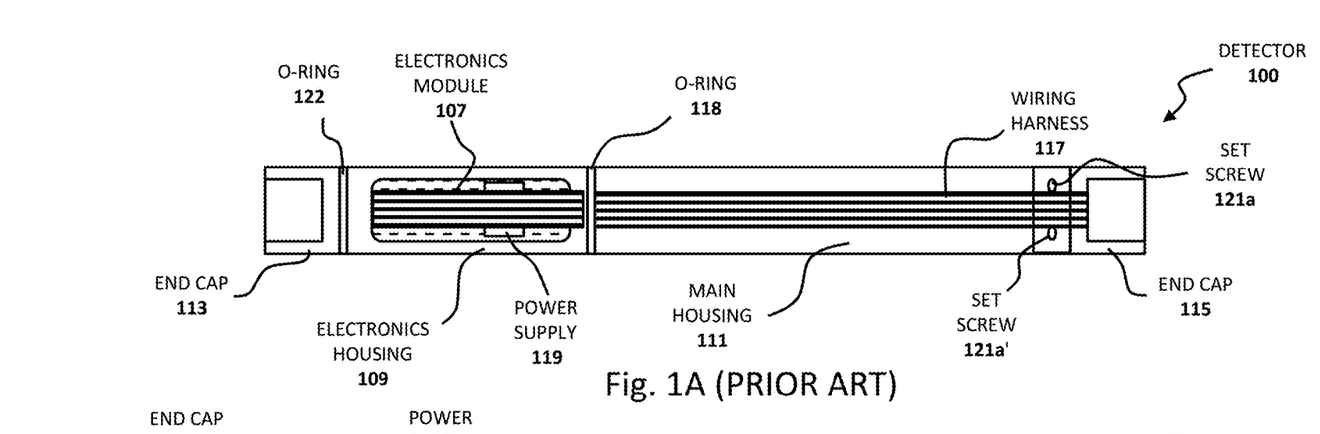
FIG. 1A is a side elevation view of an example of a conventional downhole gamma ray detector 100 known in the prior art.
Figure 1B:
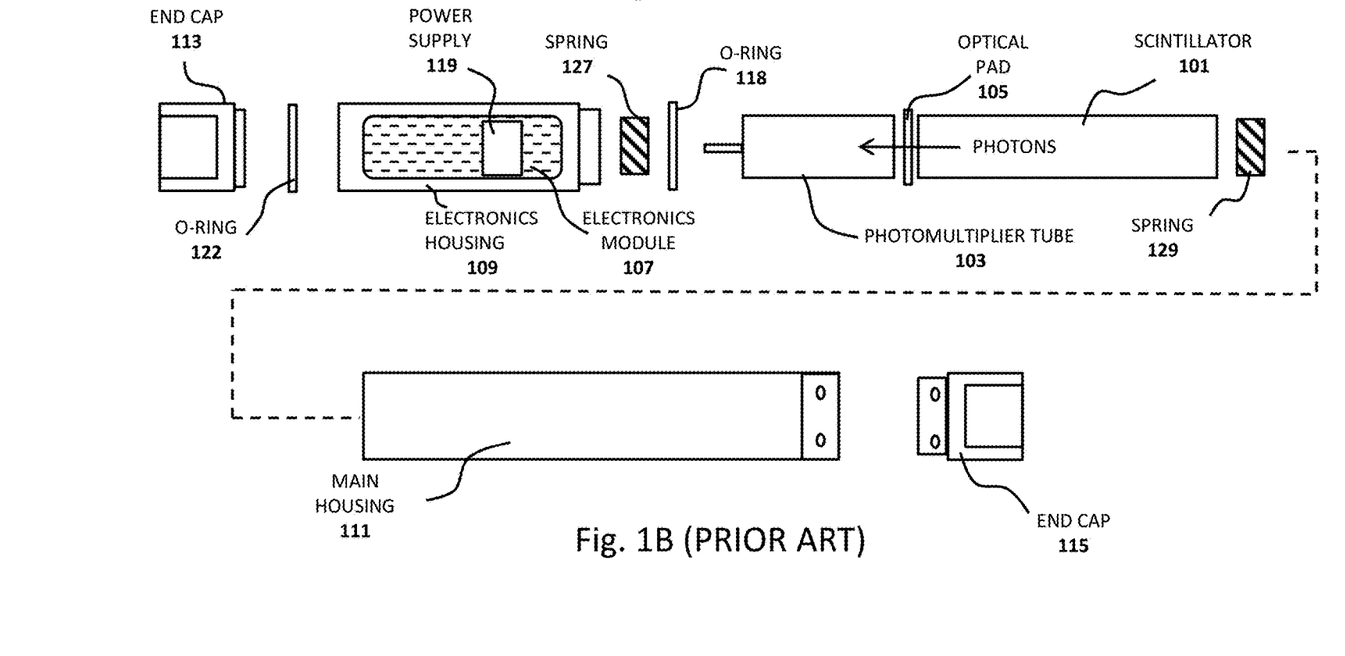
FIG. 1B is an exploded view of the conventional downhole gamma ray detector 100 of FIG. 1A showing the presence of an optical pad 105 between the photomultiplier tube 103 and the scintillator 101.

Conventional downhole gamma ray detectors have a scintillator module with a scintillator window adjacent to a photomultiplier tube with protection from contact of these two components being typically provided by a transparent oil-filled optical pad, located between the scintillator window and the receiving end of the photomultiplier tube. An example of such an arrangement is shown in FIGS. 1A and 1B where FIG. 1A illustrates a side view of the assembled detector 100 and FIG. 1B shows an exploded side view with additional components shown.

This conventional detector 100 has a scintillator 101 which emits photos upon impact of gamma rays. The photons are directed to a photomultiplier tube 103 in the direction of the arrow shown. In FIG. 1B, it is seen in this conventional arrangement that the left end of the scintillator 101 is separated from the right end of the photomultiplier tube 103 by an optical pad 105 which acts as a buffer between the adjacent ends of the scintillator 101 and the photomultiplier tube 103. The optical pad 105 is formed of transparent material and may have a hollow oil-filled interior to provide resiliency. The optical pad 105 allows photons to pass from the scintillator 101 to the photomultiplier tube 103. The photomultiplier tube 103, the optical pad 105 and the scintillator 101 are moveable with the main housing 111 and moveable with respect to each other. It is believed that independent movement of the photomultiplier tube 103 toward the scintillator 101, or vice versa, is responsible for destructive impacts between these two components despite the presence of the optical pad 105 when conventional gamma ray detectors are used to log data in wells being drilled using modern drilling techniques.

The photomultiplier tube 103 connects to an electronics module 107 for processing of signals produced by the photomultiplier tube 103. The electronics module 107 is retained within an electronics housing 109. The electronics housing 109 is configured for connection to a main housing 111 which holds the photomultiplier tube 103, the optical pad 105 and the scintillator 101. End caps 113 and 115 are configured for connection to the electronics housing 109 and main housing 111 respectively.

A wiring harness 117 (omitted in FIG. 1B to preserve clarity) for transmission of signals from the electronics module 107 runs outward from the electronics module 107 and along the outer surface of the main housing 111. It is seen that the wiring harness 117 runs above the power supply 119 which is part of the electronics module 107. A spring 127 is provided between the end of the electronics housing 109 and the photomultiplier tube 103. Another spring 129 is provided between the end of the scintillator 101 and the end of the main housing 111, to which cap 115 is attached. O-ring 118 forms a seal between the main housing 111 and the electronics housing 109 and o-ring 122 forms a seal between end cap 113 and the electronics housing 109. End cap 115 is connected to the main housing 111 with a pair of set screws 121a and 121a'.

In the past, gamma ray detectors having an arrangement similar to the detector 100 of FIGS. 1A and 1B had been sufficient to prevent damage to the detector while it experienced various shocks and vibrations drilling. It is believed that the optical pad 105 prevented severe impact of the end of the scintillator 101 on the adjacent end of the photomultiplier tube 103 despite the fact that these components are moveable with respect to each other within the main housing 111. However, modern drilling techniques tend to cause much more severe downhole shocks and vibrations. The inventors have noted that these modern drilling techniques cause frequent damage at the scintillator window and at the receiving end of the photomultiplier tube, indicating that impacts at these surfaces is causing the damage. Embodiments of a downhole gamma ray detector described hereinbelow are provided in an effort to overcome this and other problems which have been identified by the present inventors.

In the process of producing an improved downhole gamma ray detector, the inventors have conceived of additional embodiments to reduce damage to the sensitive components of the detector which are described hereinbelow.

Various aspects of the invention will now be described with reference to an example embodiment shown in FIGS. 2-8. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Example Embodiment of a Shock-Resistant Downhole Gamma Ray Detector

Referring now to FIGS. 2 to 8, there is shown one embodiment of a shock-resistant downhole gamma ray detector 200 in a number of different views wherein certain components are either shown or omitted in order to facilitate illustration of the functional aspects of the device.

Figure 2:
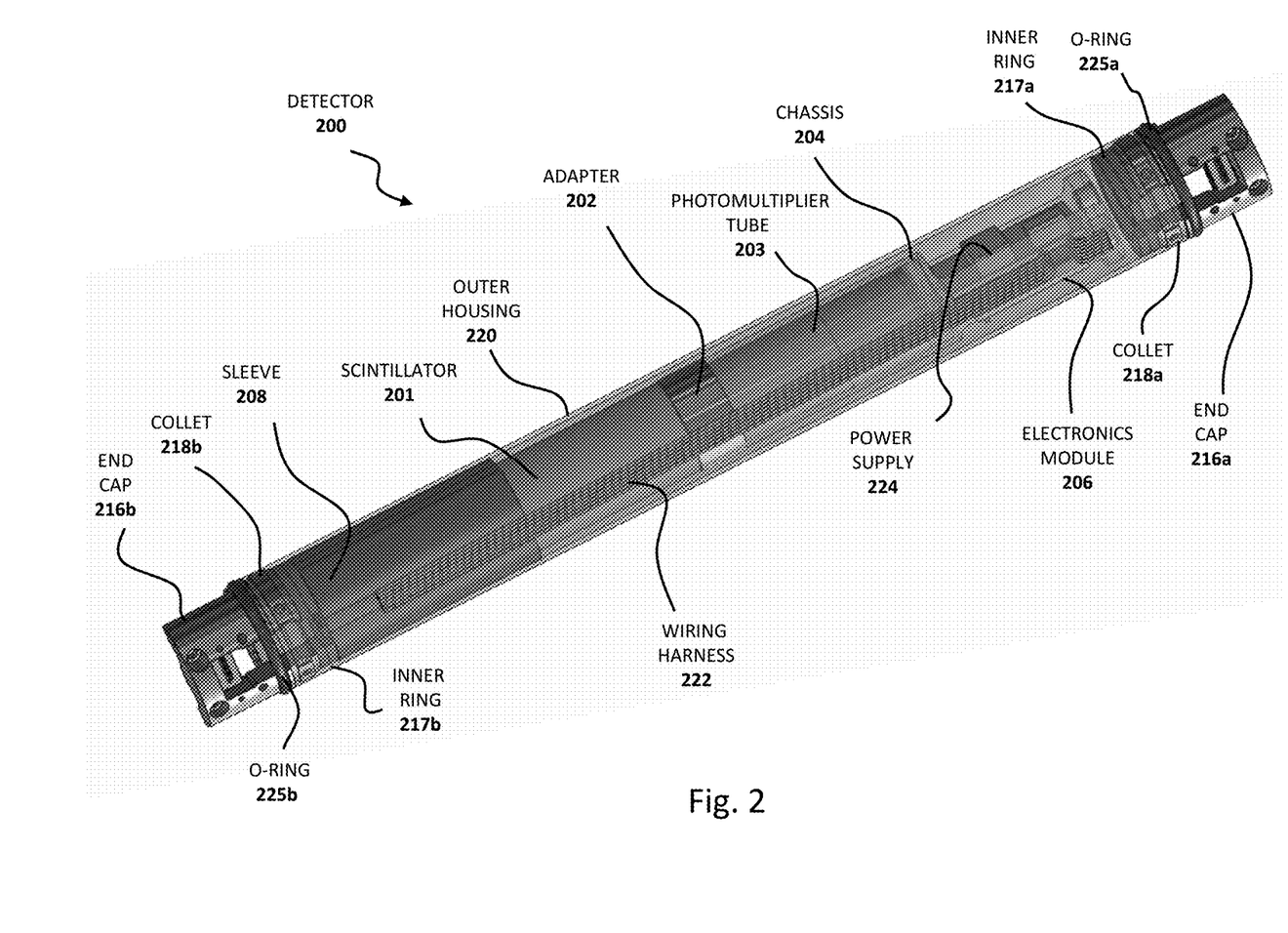
FIG. 2 is a partially transparent perspective view of one embodiment of a downhole gamma ray detector 200 assembly showing only a left section of a sleeve 208 to facilitate views of interior components.
Figure 4:
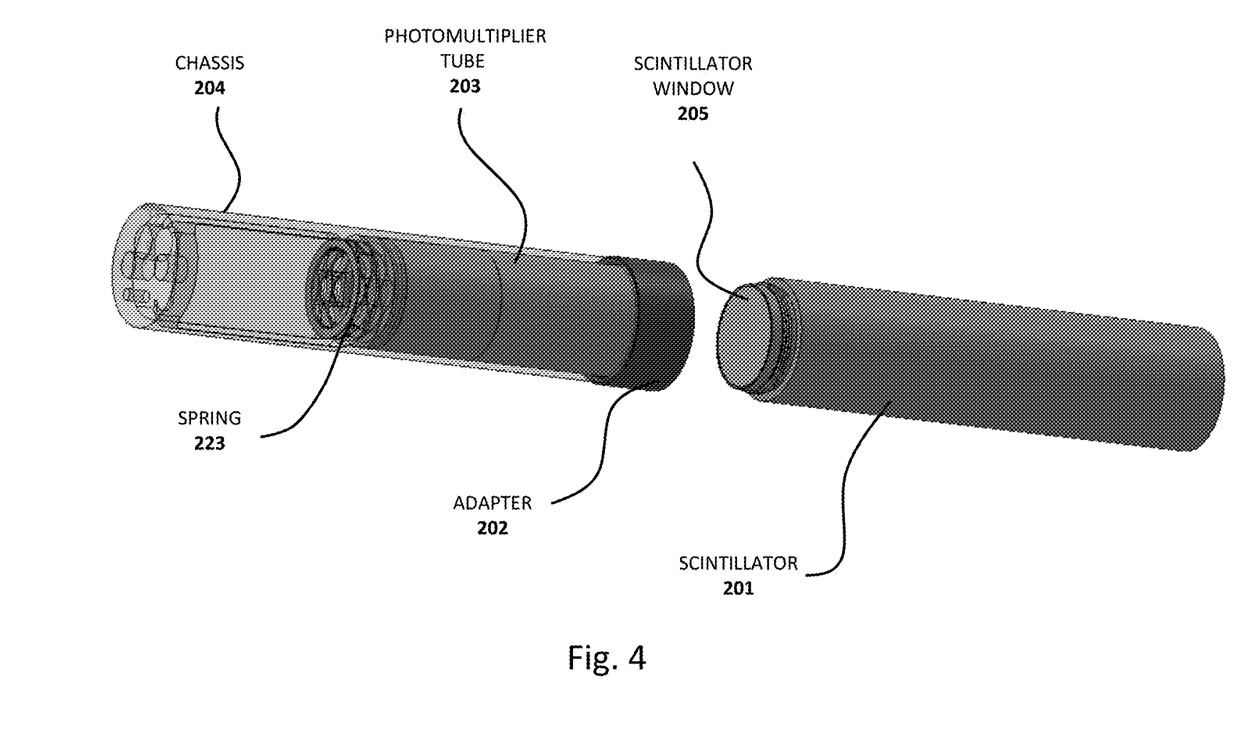
FIG. 4 is a partially exploded view of selected components of the downhole gamma ray detector 200 showing separation of the scintillator 201 from the adapter 202.
Figure 5A:
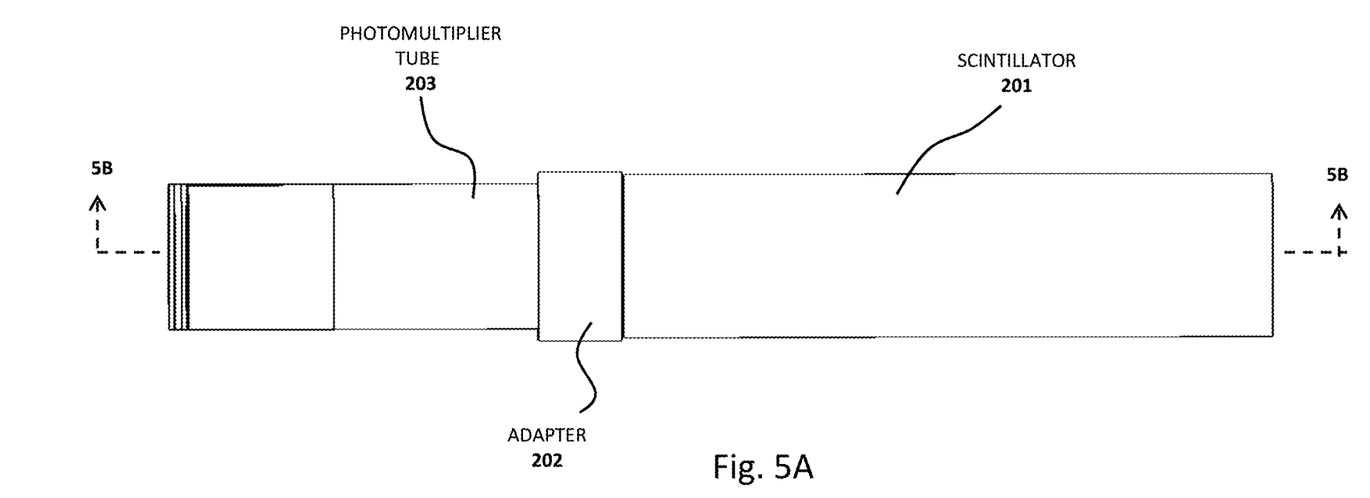
FIG. 5A is a plan view of selected of selected components of the downhole gamma ray detector 200 including the scintillator 201, the adapter 202 and the photomultiplier tube 203.
Figure 5B:
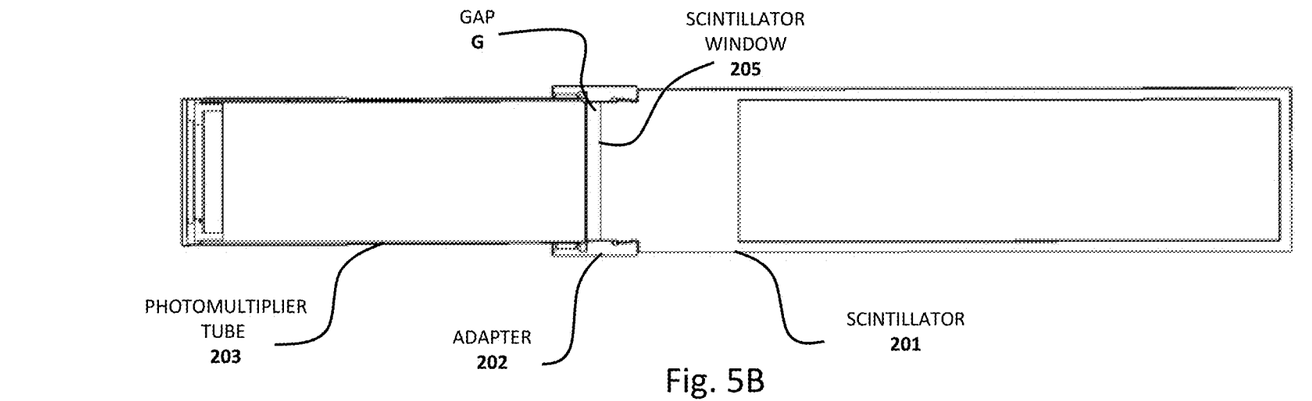
FIG. 5B is a cross-sectional view taken along line 5B-5B of FIG. 5A, showing the interior of the adapter 202 and the gap G between the scintillator window 205 and the photon-receiving end of the photomultiplier tube 203.
Figure 6:
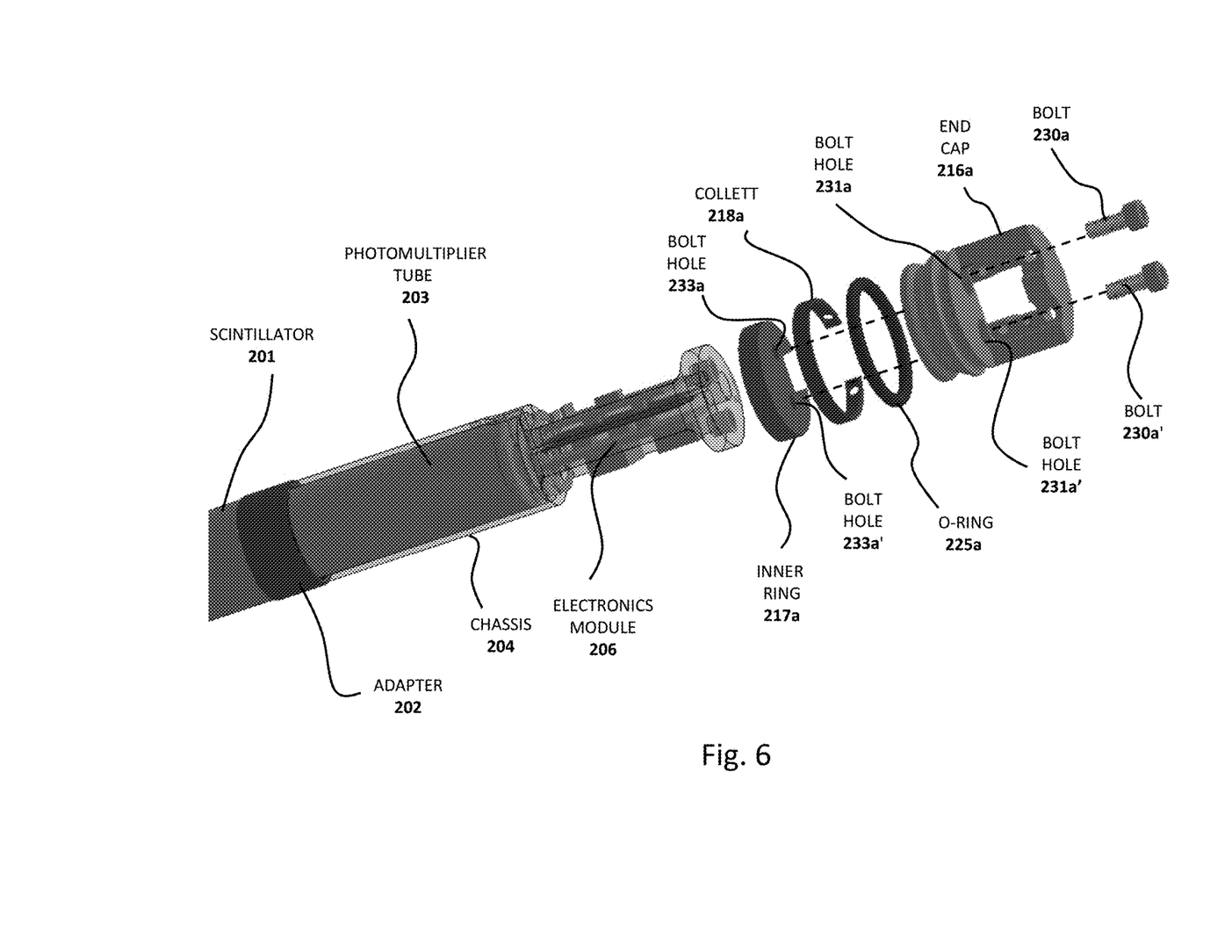
FIG. 6 is an exploded view of the right end of the detector 200 of the view shown in FIG. 2 showing detail of the collet mechanism for connecting the end cap 216a to the end of the outer housing 220 (not shown in FIG. 6).
Figure 7:
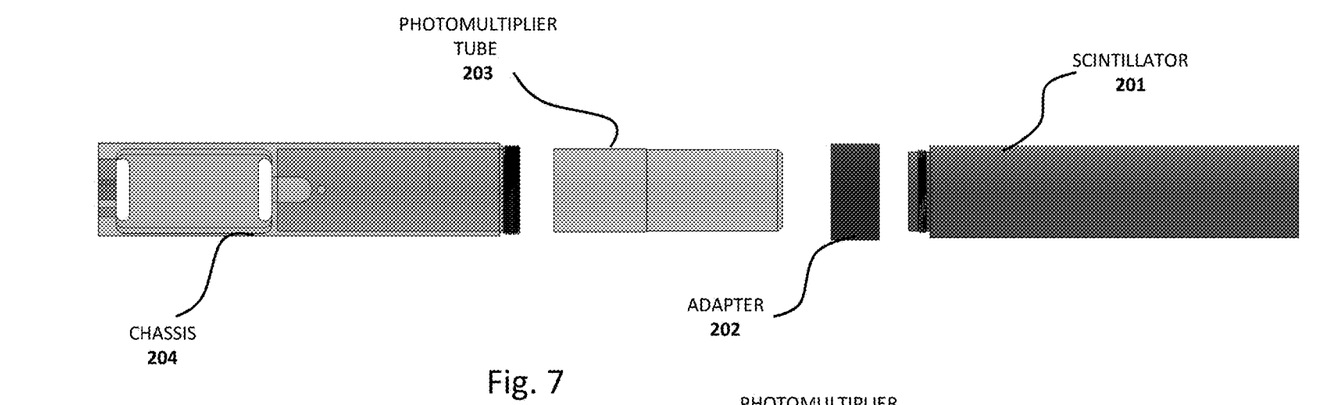
FIG. 7 is an exploded plan view of selected components of the detector 200 including the chassis 204, the photomultiplier tube 203, the adapter 202 and the scintillator 201.

FIG. 2 is a perspective illustration of the assembled detector 200 which includes a scintillator 201 and a photomultiplier tube 203 connected to each other using an adapter 202 in an arrangement which is best seen in FIGS. 4 and 5. The photomultiplier tube 203 is held within a chassis 204, which is also constructed to hold an electronics module 206 formed of two panels in a sandwich-like arrangement at the left end of the chassis 204 in the view of FIGS. 4 and 5. This portion of the chassis 204 has an hourglass shape to provide opposing windows to expose the components of the electronics module 206 (the hourglass shape of this end of the chassis 204 is best seen in FIG. 6).

Figure 3:
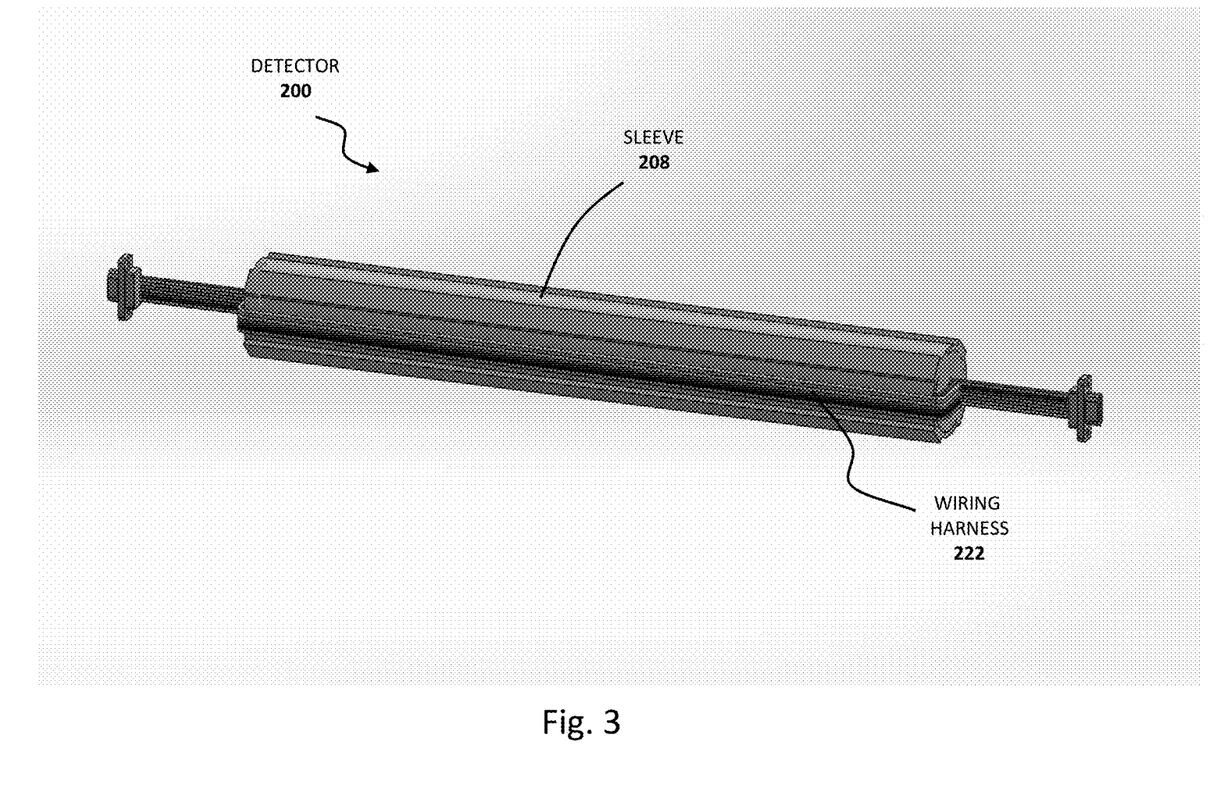
FIG. 3 is a perspective view of the downhole gamma ray detector 200 showing complete coverage of the outer housing with sleeve 208.

A sleeve 208 is shown partially in FIG. 2 at the left end of the device in order to prevent it from obscuring other components. It is to be understood that the sleeve 208 covers the entire length of the device between the end caps 216a and 216b. FIG. 3 shows the entire length of the sleeve 208 with the wiring harness 222 running along the outer surface of the sleeve 208 (the end caps 216a and 216b are not shown in this view). The sleeve 208 covers the chassis 204, adapter 202 and scintillator 201 in order to provide a cushioning layer to protect these components against shocks and vibrations. In some embodiments, the sleeve 208 is formed of an elastomeric material which can be easily stretched over the chassis 204, adapter 202 and scintillator 201. It can be seen in FIG. 3 that the sleeve 208 has outer surface grooves to enhance the cushioning effect. The outer housing 220 fits over the sleeve 208. Alternative embodiments may include more than one sleeve covering portions of the components described hereinabove. For example, a smaller sleeve may be provided to partially encase the scintillator 201 and a second smaller sleeve may be provided to partially encase the chassis 204.

It is best seen in FIG. 2 that a wiring harness 222 runs along the length of the detector 200. In this view, the ends of the wiring harness 222 are truncated in order to prevent it from obscuring other components shown in this view. The wiring harness 222 is to be understood to run the entire length of the device and to make connections to other wiring arrangements in other parts of the drill-string equipment in a conventional manner. The wiring harness 222 enters the chassis 204 at the hourglass portion and runs between the sandwiched panels of the electronics module 206 where it makes any required connections thereto. This arrangement is expressly made different than the conventional arrangement shown in FIG. 1A where the wiring harness 117 of detector 100 runs above the power supply 119 of the electronics module 107. The arrangement of the wiring harness 222 of detector 200 avoids running above the power supply 224 to prevent electronic interference. As such, the placement of the wiring harness 222 between the sandwiched panels of the electronics module 206 represents a useful improvement over conventional placement of the wiring harness 117 with respect to the power supply 119.

Referring now to FIGS. 4 and 5, the connections between the scintillator 201, the adapter 202 and the photomultiplier tube 203 will now be described. As noted above, it was recognized that modern drilling techniques have been discovered to produce much harsher shocks and vibrations which cause damage to the adjacent ends of the scintillator 101 at the scintillator window 205, and the photomultiplier tube 203. This damage causes irregularities in data produced by the detector 200. The detector 200 of the present embodiment is provided with a defined gap G between the scintillator window 205 and the adjacent photon-receiving end of the photomultiplier tube 203 which is shown in FIG. 5B. The adapter 202 is provided with a reduced internal diameter on the left side in the view of FIG. 5B. This reduced diameter acts as a stop which prevents the end of the photomultiplier tube 203 from contacting the scintillator window 205, thereby defining the gap G. This differs from the conventional arrangement described hereinabove, where an optical pad 105 has been sandwiched between the scintillator 101 and the adjacent end of the photomultiplier tube 103 to cushion the impact between these components which occurs when the detector 100 receives shocks and vibrations as a result of the drilling process. While the gap G is provided by the adapter 202 in the present embodiment of the detector 200, other arrangements can be envisioned to provide a similar gap. Such alternative arrangements will not involve the use of an adapter. For example, the photomultiplier tube could be re-designed to incorporate a female connector end with a reduced interior diameter to prevent the opposed male end of the scintillator from contacting the opposed end of the photomultiplier tube, or vice versa. In such a manner, a defined gap is provided without the presence of an adapter. The defined gap prevents contact of the opposed ends of the photomultiplier tube and the scintillator to prevent damage to these components. However, the use of an adapter is advantageous in situations where it is desirable to employ non-customized or standard photomultiplier tubes and scintillators marketed by others in construction of the detector. Both of these arrangements are within the scope of the invention as defined by the claims.

Figure 8:
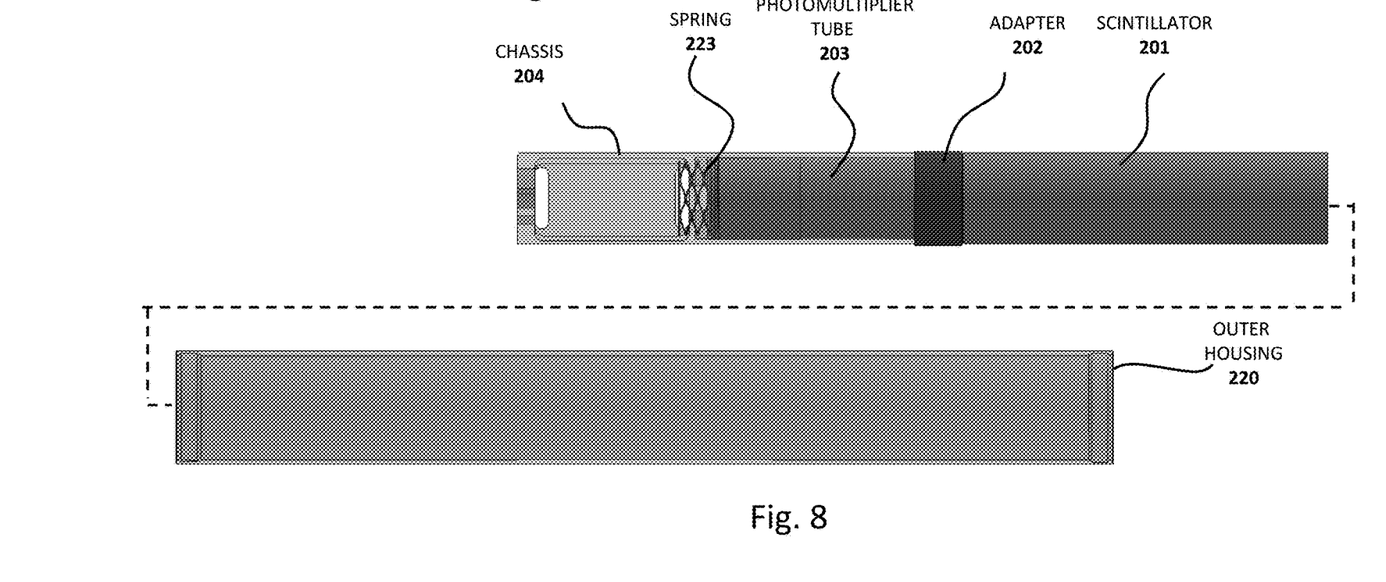
FIG. 8 is a partially exploded view of selected components of the detector illustrating how a series of assembled components including the chassis 204, the spring 223, the photomultiplier tube 203, the adapter 202 and the scintillator 201 fit inside the outer housing 220.

Additionally shown in FIGS. 4 and 8 (and intentionally omitted from the other Figures in an effort to preserve clarity) is a spring 223 which is placed between the left end of the photomultiplier tube 203 and the hourglass portion of the chassis 204 which holds the electronics module 206. This spring 223 will provide cushioning of axial vibrations of the connected photomultiplier tube 203, adapter 202 and scintillator 201. Since these components move together, and particularly since a fixed empty gap exists between the scintillator window 205 and the photo-receiving end of the photomultiplier tube 203, these components are cannot be damaged by striking each other.

The end caps 216a and 216b are of identical construction in this particular embodiment, and are configured to connect to the outer housing 220 in a collet mechanism which is illustrated in an exploded perspective view in FIG. 6 with respect to end cap 216a. It is to be understood that while end cap 216b is not shown in FIG. 6, end cap 216b is provided with an identical collet mechanism. In FIG. 6, it is seen that a collet 218a is located between inner ring 217a and the end cap 216a. The end cap 216a connects to the inner ring 217a with a pair of bolts 230a and 230a'. The pressure induced by tightening the bolts 230a and 230a' compresses the collet 218a, causing it to deform outward and frictionally engage with the inner sidewall of the outer housing 220. This frictional engagement is believed to be more resistant to shocks and vibrations than the set-screw arrangement used in conventional downhole gamma ray detectors, as shown in FIG. 1A. An o-ring 225a is shown in FIG. 6 to seal the point of connection of the end cap 216a to the end of the outer housing 220. It is also shown in FIG. 6 that the inner ring 217a and the end cap 216a each have openings to allow passage of the wiring harness 222 (not shown in FIG. 6 to preserve clarity).

Equivalents and Scope

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs.

While this invention has been particularly shown and described with references to embodiments thereof, it will be understood by those skilled in the art that various changes in form and details may be made therein without departing from the scope of the invention encompassed by the appended claims.

The invention claimed is:

1. A downhole gamma ray detector comprising:
a scintillator with a first end having a window for emitting photons upon receipt of gamma rays, the first end facing and connected to a photon-receiving end of a photomultiplier tube, wherein the scintillator and the photomultiplier tube are connected together in a fixed arrangement with respect to each other to provide an empty gap between the window and the photon-receiving end of the photomultiplier tube, wherein the empty gap abuts both the window and the photon-receiving end to prevent contact of the scintillator window and the photomultiplier tube when the detector is subject to shocks or vibrations,
an adapter connected to the scintillator and photomultiplier tube, the adaptor having a reduced internal diameter acting as a stop and to provide the fixed arrangement and the empty gap is within the interior of the adapter;
an elastomeric cushioning sleeve covering the scintillator, the adapter and the photomultiplier tube, the cushioning sleeve having longitudinal sleeve grooves; and,
a rigid outer housing covering and containing the cushioning sleeve and where the sleeve grooves cushion the photomultiplier tube from contact with the rigid outer housing.

2. The detector of claim 1 wherein the photomultiplier tube and an electronics module are within a chassis connected to the adapter.

3. The detector of claim 2, further comprising a spring between the electronics module and the photomultiplier tube for cushioning axial vibrations.

4. The detector of claim 1, further comprising an end cap fixed to each end of the rigid outer housing, wherein the end cap is configured to engage with an inner sidewall of the outer housing via an internal collet mechanism.

5. A downhole gamma ray detector comprising:
a scintillator with a window for emitting photons upon receipt of gamma rays, the window facing a photon-receiving end of a photomultiplier tube, wherein the scintillator and the photomultiplier tube are held in a fixed arrangement with respect to each other to provide an empty gap between the window and the photon-receiving end of the photomultiplier tube and a sleeve is provided to cover the scintillator and the photomultiplier tube;
a rigid outer housing for covering the sleeve;
an end cap fixed to each end of the outer housing, wherein the end cap of each end of the outer housing is configured to engage with the outer housing in an internal collet mechanism; and
wherein the collet mechanism is provided by an inner ring which connects to the end cap with a pair of screws which compress a collet therebetween.

* * * * *